United States Patent
Rajan et al.

(10) Patent No.: US 12,367,596 B2
(45) Date of Patent: Jul. 22, 2025

(54) FUSION-BASED OBJECT TRACKER USING LIDAR POINT CLOUD AND SURROUNDING CAMERAS FOR AUTONOMOUS VEHICLES

(71) Applicant: Tata Consultancy Services Limited, Mumbai (IN)

(72) Inventors: Manoj Chathankulangara Rajan, Bangalore (IN); Malneedi Vamsi, Bangalore (IN); Edwin Kanjirathinal Jose, Bangalore (IN); Arunkrishna Thayyilravi, Bangalore (IN); Aparna Mini Parameswaran, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 392 days.

(21) Appl. No.: 18/116,977

(22) Filed: Mar. 3, 2023

(65) Prior Publication Data

US 2023/0334673 A1    Oct. 19, 2023

(30) Foreign Application Priority Data

Apr. 18, 2022   (IN) .............................. 202221022815

(51) Int. Cl.
*G06T 7/246* (2017.01)
*G06T 7/11* (2017.01)
(Continued)

(52) U.S. Cl.
CPC ................ *G06T 7/248* (2017.01); *G06T 7/11* (2017.01); *G06T 7/277* (2017.01); *G06T 7/292* (2017.01);
(Continued)

(58) Field of Classification Search
CPC ................ G06V 20/56; G06V 20/70; G06T 2207/20221; G01S 17/86
See application file for complete search history.

(56) References Cited

U.S. PATENT DOCUMENTS 12,007,728 B1 * 6/2024 Mohta ..................... G06F 30/27
2020/0025935 A1 * 1/2020 Liang ..................... G06V 20/64
(Continued)

FOREIGN PATENT DOCUMENTS

WO    WO-2021062536 A1 *   4/2021    ............ B25J 19/023

OTHER PUBLICATIONS

Z. Fu, H. Shang, L. Song, Z. Li and C. Chen, "Camera-LiDAR Fusion Based Three-Stages Data Association Framework for 3D Multi-Object Tracking," 2022 2nd International Conference on Networking Systems of AI (INSAI), Shanghai, China, 2022, pp. 152-157, doi: 10.1109/INSAI56792.2022.00037. (Year: 2022).*
(Continued)

*Primary Examiner* — Chan S Park
*Assistant Examiner* — Chandhana Pedapati
(74) *Attorney, Agent, or Firm* — Finnegan, Henderson, Farabow, Garrett & Dunner, LLP

(57) ABSTRACT

Unlike existing methods, using LIDAR and 2D-cameras for detection and limit in providing robust tracking of objects, the method disclosed addresses the technical challenge by utilizing 3D-LIDAR points clouds, 2D-camera images and additionally 2D-BEV from 3D LIDAR point clouds to provide, robust, seamless, 360 tracking of objects. The method independently detects, and tracks objects captured by each of the LIDAR, 2D-camera set up mounted on an autonomous vehicle. Detection and tracking is performed on 2D-Camera and 2D-BEV and fused with 3D-Lidar tracker, Additionally, non-occluded area of an object in 2D-bounding boxes, is identified by superimposing panoptic segmentation output with 2D-BB, that helps to eliminate the lidar points falling on the irrelevant objects and provides accurate real world position of the detected objects in the point cloud. An enhanced 2D object detector based on a customized NN architecture employing MISH activation function is also introduced.

17 Claims, 16 Drawing Sheets

(51) Int. Cl.
  G06T 7/277    (2017.01)
  G06T 7/292    (2017.01)
  G06V 10/26    (2022.01)
  G06V 10/30    (2022.01)
  G06V 10/40    (2022.01)
  G06V 10/82    (2022.01)
  G06V 20/56    (2022.01)
  G06V 20/70    (2022.01)

(52) U.S. Cl.
  CPC ............. *G06V 10/26* (2022.01); *G06V 10/30* (2022.01); *G06V 10/40* (2022.01); *G06V 10/82* (2022.01); *G06V 20/56* (2022.01); *G06V 20/70* (2022.01); *G06T 2207/10028* (2013.01); *G06T 2207/20081* (2013.01); *G06T 2207/20084* (2013.01); *G06T 2207/20221* (2013.01); *G06T 2207/30241* (2013.01); *G06T 2207/30252* (2013.01)

(56) References Cited

U.S. PATENT DOCUMENTS

| | | | |
|---|---|---|---|
| 2021/0063578 A1* | 3/2021 | Wekel | G01S 17/894 |
| 2021/0103027 A1 | 4/2021 | Harrison | |
| 2022/0024485 A1* | 1/2022 | Theverapperuma | G06V 20/58 |
| 2022/0080999 A1* | 3/2022 | Vora | G06N 3/045 |

OTHER PUBLICATIONS

Liang, Tingting, et al. "Bevfusion: A simple and robust lidar-camera fusion framework." Advances in Neural Information Processing Systems 35 (2022): 10421-10434. (Year: 2022).*

Kumar et al., "LiDAR and Camera Fusion Approach for Object Distance Estimation in Self-Driving Vehicles," Symmetry, 12(324) (2020).

Wei et al., "LiDAR and Camera Detection Fusion in a Real-Time Industrial Multi-Sensor Collision Avoidance System," Electronics, 7(0) (2018).

Yeniaydin, "Sensor Fusion of a Camera and 2D LiDAR for Lane Detection and Tracking," Thesis submitted to the Graduate School of Natural and Applied Sciences of Middle East Technical University (2019).

Zhang et al., "Vehicle Detection Based on LiDAR and Camera Fusion," 2014 IEEE 17$^{th}$ International Conference on Intelligent Transportation Systems (ITSC) (2014).

Zhao et al., "Fusion of 3D LIDAR and Camera Data for Object Detection in Autonomous Vehicle Applications," IEEE Sensors Journal, 20(9):4901-4913 (2020).

* cited by examiner

FUSION-BASED OBJECT TRACKER USING LIDAR POINT CLOUD AND SURROUNDING CAMERAS FOR AUTONOMOUS VEHICLES

PRIORITY CLAIM

This U.S. patent application claims priority under 35 U.S.C. § 119 to: Indian Patent Application No. 202221022815, filed on Apr. 18, 2022. The entire contents of the aforementioned application are incorporated herein by reference.

TECHNICAL FIELD

The embodiments herein generally relate to object tracking for autonomous vehicles and, more particularly, to a method and system for fusion-based object tracker using Light Detection and Ranging (LIDAR) point cloud and surrounding cameras for autonomous vehicles.

BACKGROUND

To get the driver's perspective of the obstacles in front of a vehicle is the most important aspect of any Advanced Driver Assistance Systems (ADAS) features or autonomous car. It is important to track the objects in its surroundings as it moves, so as to understand which objects cause potential collision with the host vehicle. 360 degree robust tracking is technically challenging considering limitations of each type of sensors in terms of coverage area, occlusions, speed of objects to be tracked etc. and environmental challenges during sensing of objects. As new technologies are emerging the accuracy in detections and tracking also improves. Attempts are made to use the strengths of sensors like Light Detection and Ranging (LIDAR) and one or more cameras along with Machine Learning (ML) techniques to create a robust trackers.

Recent existing techniques provide object tracking solutions, wherein they restrict to LIDAR and camera data fusion to seamlessly track objects in environment of a vehicle, which have limitations in terms techniques used for accurate object detection and further robust tracking in challenging scenarios such as occlusions wherein both sensors miss the object. Further, some existing method focus only on vehicles in the surrounding environment, while moving pedestrians, stationary objects such as traffic signals etc. also are of critical importance in ADAS. Furthermore, rightly focusing on objects of interest from the clutter is another challenge in object detection that happens prior to tracking. Thus, improved accuracy of object detection and further robustly and seamlessly tracking the detected objects is a domain open to research.

SUMMARY

Embodiments of the present disclosure present technological improvements as solutions to one or more of the above-mentioned technical problems recognized by the inventors in conventional systems.

For example, in one embodiment, a method for fusion based object tracking is provided. The method includes receiving a streaming data comprising (a) a plurality of 2-Dimensional (2D) images of an environment surrounding a vehicle via a 2D camera set up mounted on the vehicle, and (b) a plurality of 3-Dimensional (3D) point clouds of the environment via a Light Detection and Ranging (LIDAR) mounted on the vehicle. Further, the method includes converting each of the plurality of 3D point clouds to corresponding plurality of 2D Bird's Eye View (BEV) images. Further, the method includes simultaneously processing: (a) the plurality of 2D images (i) to detect a first set of objects in each of the plurality of 2D images using a first 2D object detector based on a customized Neural Network (NN) architecture employing a MISH activation function, and (ii) to label each object of the first set of objects of each of the plurality of 2D images with a tracker ID to track 2D camera objects corresponding to the first set of objects using a 2D camera tracker; (b) the plurality of 2D BEV images to (i) detect a second set of objects in each of the plurality of 2D-BEV images using a second 2D object detector based on the customized NN architecture employing the MISH activation function, and (ii) label each object of the second set of objects of each of the plurality of 2D-BEV images with the tracker ID to track 2D-BEV objects corresponding to the second set of objects using a 2D-BEV tracker; and (c) the plurality of 3D point clouds to (i) detect a third set of objects in each of the plurality of 3D point clouds using a 3D LIDAR object detector, and (ii) label each object of the third set of objects of each of the plurality of 3D point clouds with the tracker ID to track 3D LIDAR objects corresponding to the third set of objects using a 3D LIDAR tracker. Furthermore, the method includes generating a fused LIDAR tracker for a plurality of fused LIDAR objects by determining correspondence between the 2D-BEV objects in the 2D-BEV tracker and the 3D LIDAR objects in the 3D LIDAR tracker. Furthermore, the method includes generating an integrated tracker by determining correspondence between the plurality of fused LIDAR objects in the fused LIDAR tracker and the 2D camera objects in the camera tracker. Generating the integrated tracker comprising: (a) reading output from the fused LIDAR tracker and the 2D camera tracker; (b) creating a look up table for Ego motion corrected each of the plurality of 3D point clouds and corresponding plurality of 2D images using a calibration matrix; (c) identifying a non-occluded area in 2D bounding box by superimposing 2D bounding box on a panoptic segmentation output; (d) calculating positions of camera 2D detections from reprojected LIDAR points on the non-occluded area of a 2D Bounding Box (BB) by referring a point cloud-image look up table, wherein a best cluster is identified for distance estimation by selecting a set of LIDAR points of the non-occluded area using a density-based spatial clustering with noise, wherein a dominant cluster selection approach is applied to select the best cluster; (e) mapping the 2D camera objects with estimated distance to the plurality of fused LIDAR objects by selecting closest Euclidean match of a non-mapped detection; (f) merging attributes associated with the plurality of fused LIDAR object with attributes associated with a corresponding 2D camera object; (g) determining if one or more 2D camera objects fail to have corresponding mapping with the fused LIDAR objects, wherein position of the 2D BB determined by reprojection process is used; and (h) determining if one or more fused LIDAR objects fail to have corresponding mapping with the 2D camera objects, and deriving the attributes associated with the plurality of 2D camera objects for the one or more fused LIDAR objects from one of previous occurrence of the object and default values.

The first 2D object detector and second 2D object detector based on the customized NN architecture employing the MISH activation function comprises: (a) a backbone for feature extraction from 2D images; (b) a neck for feature aggregation using (i) the MISH activation function that preserves negative values, provides better regularization and generalization in training enabling enhanced detection in noisy scenarios for the received streaming data, and (ii) a Path Aggregation Network (PAN) comprising five convolutional layers further added with a Spatial Attention Module (SAM) that extract relevant features by focusing only on objects of interest that contribute to the detection tasks when in cluttered scenario; and (c) a head using the MISH activation function and additional set of convolution layers for detection of small and medium sized objects.

In another aspect, a system for fusion based object tracking is provided. The system comprises a memory storing instructions; one or more Input/Output (I/O) interfaces; and one or more hardware processors coupled to the memory via the one or more I/O interfaces, wherein the one or more hardware processors are configured by the instructions to receive a streaming data comprising (a) a plurality of 2-Dimensional (2D) images of an environment surrounding a vehicle via a 2D camera set up mounted on the vehicle, and (b) a plurality of 3-Dimensional (3D) point clouds of the environment via a Light Detection and Ranging (LIDAR) mounted on the vehicle. Further, the one or more hardware processors are configured to convert each of the plurality of 3D point clouds to corresponding plurality of 2D Birds Eye View (BEV) images. Further, the one or more hardware processors are configured to simultaneously process; (a) the plurality of 2D images (i) to detect a first set of objects in each of the plurality of 2D images using a first 2D object detector based on a customized Neural Network (NN) architecture employing a MISH activation function, and (ii) to label each object of the first set of objects of each of the plurality of 2D images with a tracker ID to track 2D camera objects corresponding to the first set of objects using a 2D camera tracker; (b) the plurality of 2D BEV images to (i) detect a second set of objects in each of the plurality of 2D-BEV images using a second 2D object detector based on the customized NN architecture employing the MISH activation function, and (ii) label each object of the second set of objects of each of the plurality of 2D-BEV images with the tracker ID to track 2D-BEV objects corresponding to the second set of objects using a 2D-BEV tracker; and (c) the plurality of 3D point clouds to (i) detect a third set of objects in each of the plurality of 3D point clouds using a 3D LIDAR object detector, and (ii) label each object of the third set of objects of each of the plurality of 3D point clouds with the tracker ID to track 3D LIDAR objects corresponding to the third set of objects using a 3D LIDAR tracker Furthermore, the one or more hardware processors are configured to generate a fused LIDAR tracker for a plurality of fused LIDAR objects by determining correspondence between the 2D-BEV objects in the 2D-BEV tracker and the 3D LIDAR objects in the 3D LIDAR tracker. Furthermore, the one or more hardware processors are configured to generate an integrated tracker by determining correspondence between the plurality of fused LIDAR objects in the fused LIDAR tracker and the 2D camera objects in the camera tracker. Generating the integrated tracker comprising (a) reading output from the fused LIDAR tracker and the 2D camera tracker; (b) creating a look up table for Ego motion corrected each of the plurality of 3D point clouds and corresponding plurality of 2D images using a calibration matrix; (c) identifying a non-occluded area in 2D bounding box by superimposing 2D bounding box on a panoptic segmentation output; (d) calculating positions of camera 2D detections from reprojected LIDAR points on the non-occluded area of a 2D Bounding Box (BB) by referring a point cloud-image look up table, wherein a best cluster is identified for distance estimation by selecting a set of LIDAR points of the non-occluded area using a density-based spatial clustering with noise, wherein a dominant cluster selection approach is applied to select the best cluster; (e) mapping the 2D camera objects with estimated distance to the plurality of fused LIDAR objects by selecting closest Euclidean match of a non-mapped detection; (f) merging attributes associated with the plurality of fused LIDAR object with attributes associated with a corresponding 2D camera object; (g) determining if one or more 2D camera objects fail to have corresponding mapping with the fused LIDAR objects, wherein position of the 2D BB determined by reprojection process is used; and (h) determining if one or more fused LIDAR objects fail to have corresponding mapping with the 2D camera objects, and deriving the attributes associated with the plurality of 2D camera objects for the one or more fused LIDAR objects from one of previous occurrence of the object and default values.

The first 2D object detector and second 2D object detector based on the customized NN architecture employing the MISH activation function comprises; (a) a backbone for feature extraction from 2D images; (b) a neck for feature aggregation using (i) the MISH activation function that preserves negative values, provides better regularization and generalization in training enabling enhanced detection in noisy scenarios for the received streaming data, and (ii) a Path Aggregation Network (PAN) comprising five convolutional layers further added with a Spatial Attention Module (SAM) that extract relevant features by focusing only on objects of interest that contribute to the detection tasks when in cluttered scenario; and (c) a head using the MISH activation function and additional set of convolution layers for detection of small and medium sized objects.

In yet another aspect, there are provided one or more non-transitory machine-readable information storage mediums comprising one or more instructions, which when executed by one or more hardware processors causes a method for fusion-based object tracking. The method includes receiving a streaming data comprising (a) a plurality of 2-Dimensional (2D) images of an environment surrounding a vehicle via a 2D camera set up mounted on the vehicle, and (b) a plurality of 3-Dimensional (3D) point clouds of the environment via a Light Detection and Ranging (LIDAR) mounted on the vehicle. Further, the method includes converting each of the plurality of 3D point clouds to corresponding plurality of 2D Bird's Eye View (BEV) images. Further, the method includes simultaneously processing: (a) the plurality of 2D images (i) to detect a first set of objects in each of the plurality of 2D images using a first 2D object detector based on a customized Neural Network (NN) architecture employing a MISH activation function, and (ii) to label each object of the first set of objects of each of the plurality of 2D images with a tracker ID to track 2D camera objects corresponding to the first set of objects using a 2D camera tracker; (b) the plurality of 2D BEV images to (i) detect a second set of objects in each of the plurality of 2D-BEV images using a second 2D object detector based on the customized NN architecture employing the MISH activation function, and (ii) label each object of the second set of objects of each of the plurality of 2D-BEV images with the tracker ID to track 2D-BEV objects corresponding to the second set of objects using a 2D-BEV tracker; and (c) the plurality of 3D point clouds to (i) detect a third set of objects in each of the plurality of 3D point clouds using a 3D LIDAR object detector, and (ii) label each object of the third set of objects of each of the plurality of 3D point clouds with the tracker ID to track 3D LIDAR objects corresponding to the third set of objects using a 3D LIDAR tracker Furthermore, the method includes generating a fused LIDAR tracker for a plurality of fused LIDAR objects by determining correspondence between the 2D-BEV objects in the 2D-BEV tracker and the 3D LIDAR objects in the 3D LIDAR tracker. Furthermore, the method includes generating an integrated tracker by determining correspondence between the plurality of fused LIDAR objects in the fused LIDAR tracker and the 2D camera objects in the camera tracker. Generating the integrated tracker comprising (a) reading output from the fused LIDAR tracker and the 2D camera tracker; (b) creating a look up table for Ego motion corrected each of the plurality of 3D point clouds and corresponding plurality of 2D images using a calibration matrix; (c) identifying a non-occluded area in 2D bounding box by superimposing 2D bounding box on a panoptic segmentation output; (d) calculating positions of camera 2D detections from reprojected LIDAR points on the non-occluded area of a 2D Bounding Box (BB) by referring a point cloud-image look up table, wherein a best duster is identified for distance estimation by selecting a set of LIDAR points of the non-occluded area using a density-based spatial clustering with noise, wherein a dominant duster selection approach is applied to select the best duster; (e) mapping the 2D camera objects with estimated distance to the plurality of fused LIDAR objects by selecting closest Euclidean match of a non-mapped detection; (f) merging attributes associated with the plurality of fused LIDAR object with attributes associated with a corresponding 2D camera object; (g) determining if one or more 2D camera objects fail to have corresponding mapping with the fused LIDAR objects, wherein position of the 2D BB determined by reprojection process is used; and (h) determining if one or more fused LIDAR objects fail to have corresponding mapping with the 2D camera objects, and deriving the attributes associated with the plurality of 2D camera objects for the one or more fused LIDAR objects from one of previous occurrence of the object and default values.

The first 2D object detector and second 2D object detector based on the customized NN architecture employing the MISH activation function comprises: (a) a backbone for feature extraction from 2D images; (b) a neck for feature aggregation using (i) the MISH activation function that preserves negative values; provides better regularization and generalization in training enabling enhanced detection in noisy scenarios for the received streaming data, and (ii) a Path Aggregation Network (PAN) comprising five convolutional layers further added with a Spatial Attention Module (SAM) that extract relevant features by focusing only on objects of interest that contribute to the detection tasks when in cluttered scenario; and (c) a head using the MISH activation function and additional set of convolution layers for detection of small and medium sized objects.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
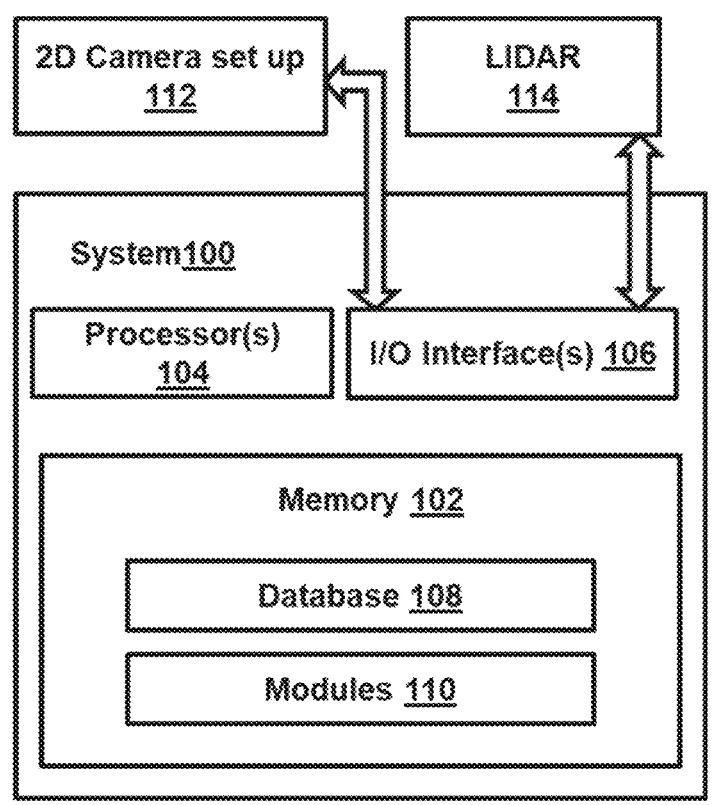
FIG. 1 is a functional block diagram of a system, for fusion-based object tracker using 3D Light Detection and Ranging (LIDAR) point clouds and surrounding cameras for an autonomous vehicle, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments of the present disclosure provide a method and system for fusion-based object tracker using Light Detection and Ranging (LIDAR) point cloud and surrounding cameras for autonomous vehicles.

Unlike the existing methods which mostly rely on use only LIDAR and cameras for detection and tracking that are a technical limitation for robust 360 degree tracking of objects, the method disclosed addresses the technical challenge by utilizing 3D LIDAR points clouds, 2D camera images and additionally 2D-Bird Eye View (BEV) images obtained from 3D LIDAR point clouds to provide, robust, seamless, 360 tracking of objects. The method independently detects, and tracks objects captured by each of the LIDAR, a 2D camera set up mounted on a vehicle, for example, an autonomous vehicle. The independently tracked objects are then fused in two steps. Firstly, fusion of 3D LIDAR and 2D-BEV tracking in LIDAR space is performed, which helps to reduce the drops in track ID's as long as object continues to be seen in LIDAR without major occlusion. For example, even if tracking is failed in 3D LIDAR, but the tracking is consistent in BEV tracker, the fusion of 2D-BEV to 3D LIDAR helps in ensuring tracker ID consistency. Tracking in 2D-BEV image is more effective and is performed using a 2D object tracker similar to a 2D object tracker for the 2D camera images. The relationship of in 2D-BEV box to its corresponding 3D box is prior known. From the 2D BEV-image, a 2D-BEV tracker extracts both geometrical and image level features for ensuring robust tracking. Hence, the fusion of 2D-BEV tracking along with velocity-based tracker in available in 3D LIDAR, results in effective tracking. Position in real world of 2D camera detection is estimated by reverse mapping of 2D Camera detection using reprojected lidar points on the non-occluded area of 2D box. Non-occluded area is identified using a panoptic segmentation algorithm. Clustering algorithms are used for estimating the distance and removing outlier from reprojected lidar points. Thereafter, further fusion of the fused LIDAR and camera data is performed. 3D co-ordinates of LIDAR are mapped to the real world position of 2D camera detection using closest Euclidean algorithm. If the Euclidean distance is within a certain threshold, then the track ID matching is performed, and the appropriate final track ID is assigned. For all the boxes where 3D Lidar tracks are available, 3D position is updated. For the rest of the boxes, real world position calculated prior by reprojection algorithm is updated.

Furthermore, the 2D object detection is performed by a 2D object detector which is based on a customized Neural Network (NN) architecture employing a MISH activation function. The 2D object detector enhances feature extraction effectively improving detections for small and medium sized objects due to refined feature. The customized NN architecture employing the MISH activation function, wherein MISH function is known is the art, enables preserving negative values, better regularization, and generalization in training, resulting in improvement in detections, even in noisy or cluttered environments.

Referring now to the drawings, and more particularly to FIGS. 1 through 11B, where similar reference characters denote corresponding features consistently throughout the figures, there are shown preferred embodiments and these embodiments are described in the context of the following exemplary system and/or method.

FIG. 1 is a functional block diagram of a system, for fusion-based object tracker using 3D Light Detection and Ranging (LIDAR) point clouds and surrounding cameras for an autonomous vehicle, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like. Specifically, the system 100 can be a component of vehicle controlling system such as control system of autonomous vehicles.

The I/O interface(s) 106 can include a variety of software and hardware interfaces, for example, a web interface, a graphical user interface and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices. A 2D camera set up 112 and a LIDAR 114 mounted on the vehicle communicate with the system 100 through the I/O interface 106. The 2D camera set comprises of a plurality of cameras capturing different views of the environment of the vehicle. For example, the 2D camera set can include a left camera, a right camera and a front camera that capture different views and corresponding objects in the surrounding environment of the vehicle. A Field of View (FoV) of each of the plurality of 2D cameras covers distinct regions of the environment.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 includes a plurality of modules 110 such as a 2D object detector (a first 2D object detector and a second 2D object detector), a 2D camera tracker, a 2D-BEV tracker, a 3D LIDAR object detector, a 3D-LIDAR tracker, a fused LIDAR tracker, an integrated tracker, a Panoptic segmentation module, and other modules as in FIG. 3, depicting an overview of architecture of the system of FIG. 1. The plurality of modules are executed by the one or more hardware processors 104 for fusion-based object tracker for the vehicle. Further, the memory 102 includes a database 108 that stores a plurality of 2D images captured by the 2D camera set up, a plurality of 3D point clouds generated by the LIDAR, tracker IDs of the objects being tracked, look up tables used for object mapping from one tracker to other and the like. Further, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106. Functions of the components of the system 100 are explained in conjunction with flow diagram of FIG. 2 and FIGS. 3 through 12.

Figure 2A:
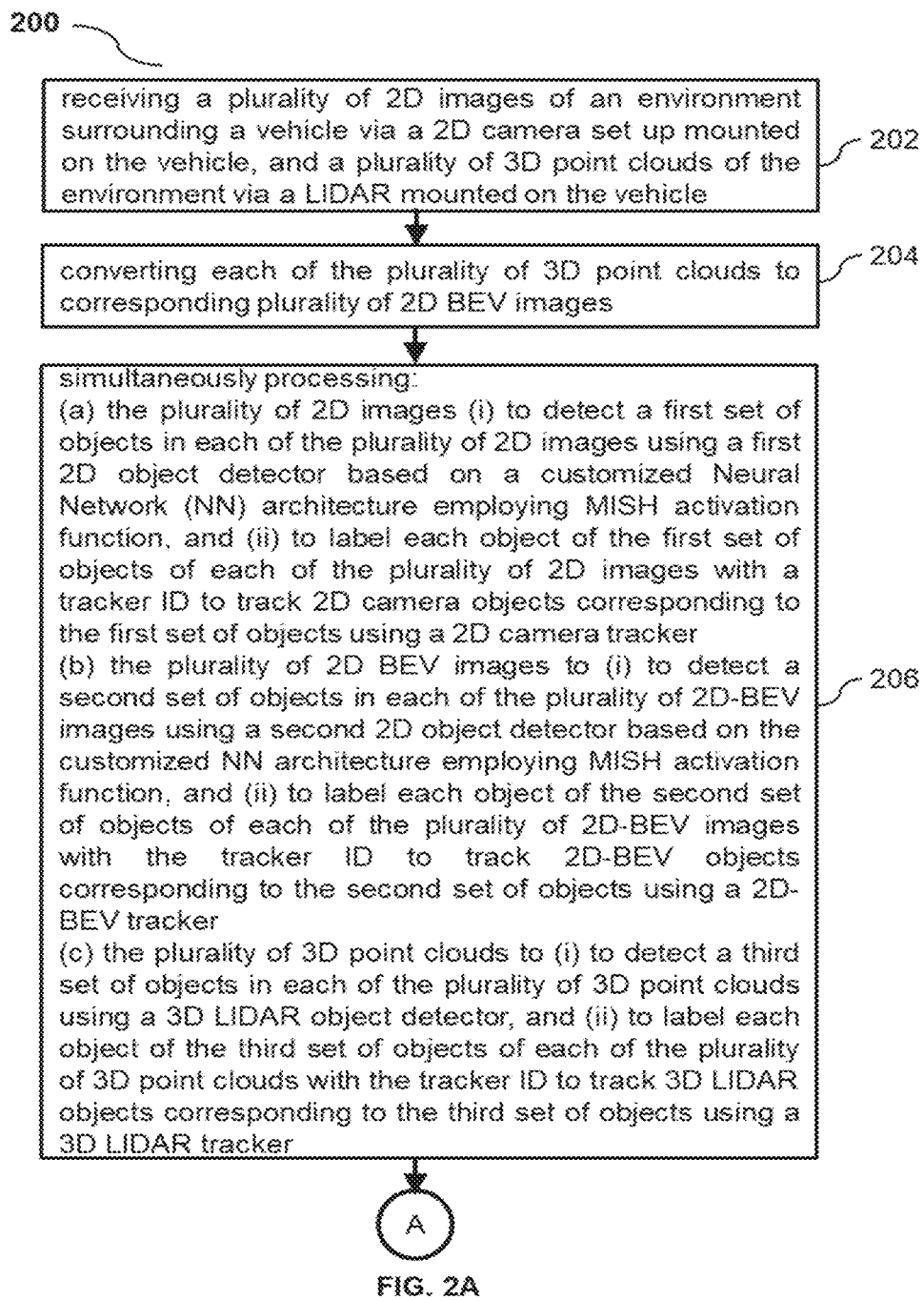
FIGS. 2A through 2B (collectively referred as FIG. 2) is a flow diagram illustrating a method for fusion-based object tracker using Light Detection and Ranging (LIDAR) point cloud and surrounding cameras for autonomous vehicles, using the system of FIG. 1, in accordance with some embodiments of the present disclosure.
Figure 2B:
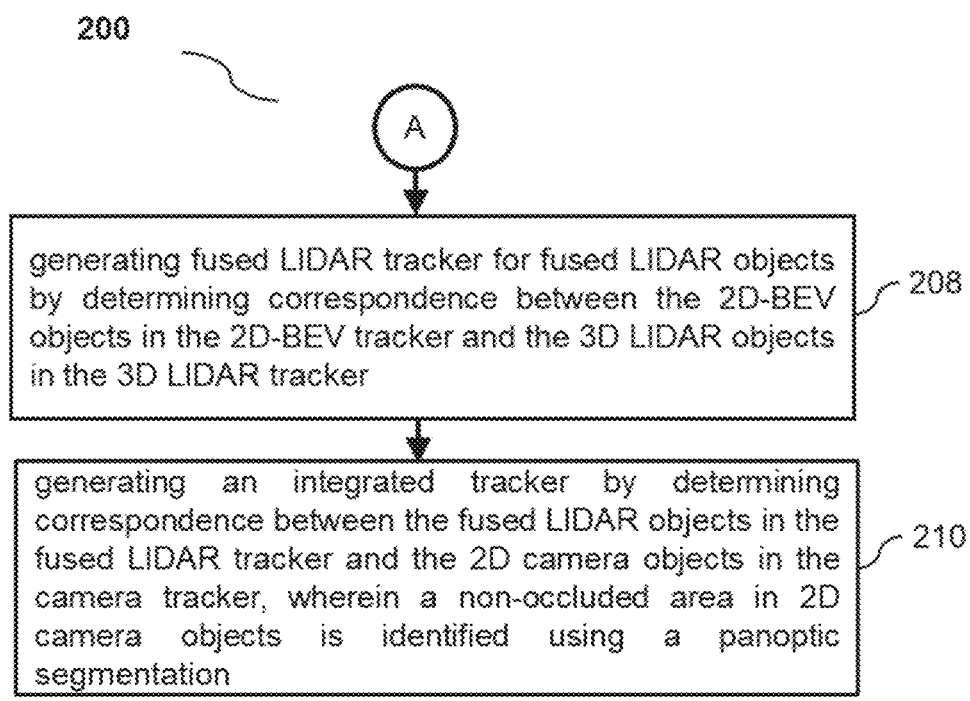

FIGS. 2A through 2B (collectively referred as FIG. 2) is a flow diagram illustrating a method 200 for fusion-based object tracker using the LIDAR point cloud and surrounding cameras for autonomous vehicles, using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 12. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Figure 3A:
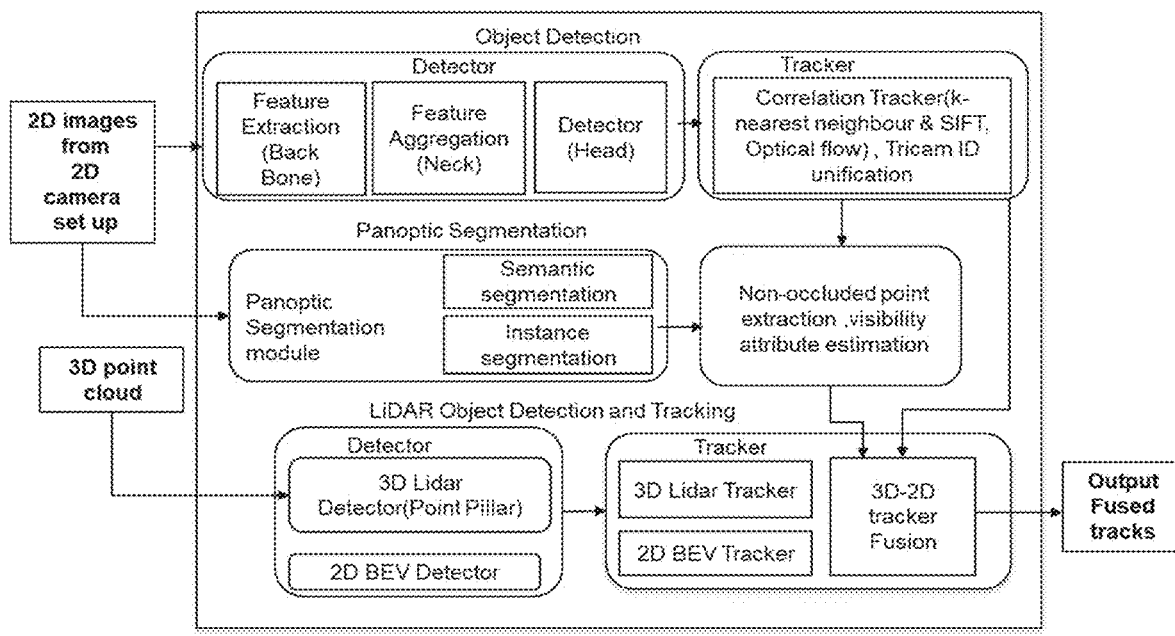
FIG. 3A depicts an overview of architecture of the system of FIG. 1 for detecting and tracking objects from 2D images from cameras and 3D point clouds from a 3D LIDAR, in accordance with some embodiments of the present disclosure.
Figure 3B:
FIGS. 3B and 3C depict system input and corresponding output comprising tracked objects across camera and 3D LIDAR point cloud views displayed to a viewer, in accordance with some embodiments of the present disclosure.
Figure 3C:
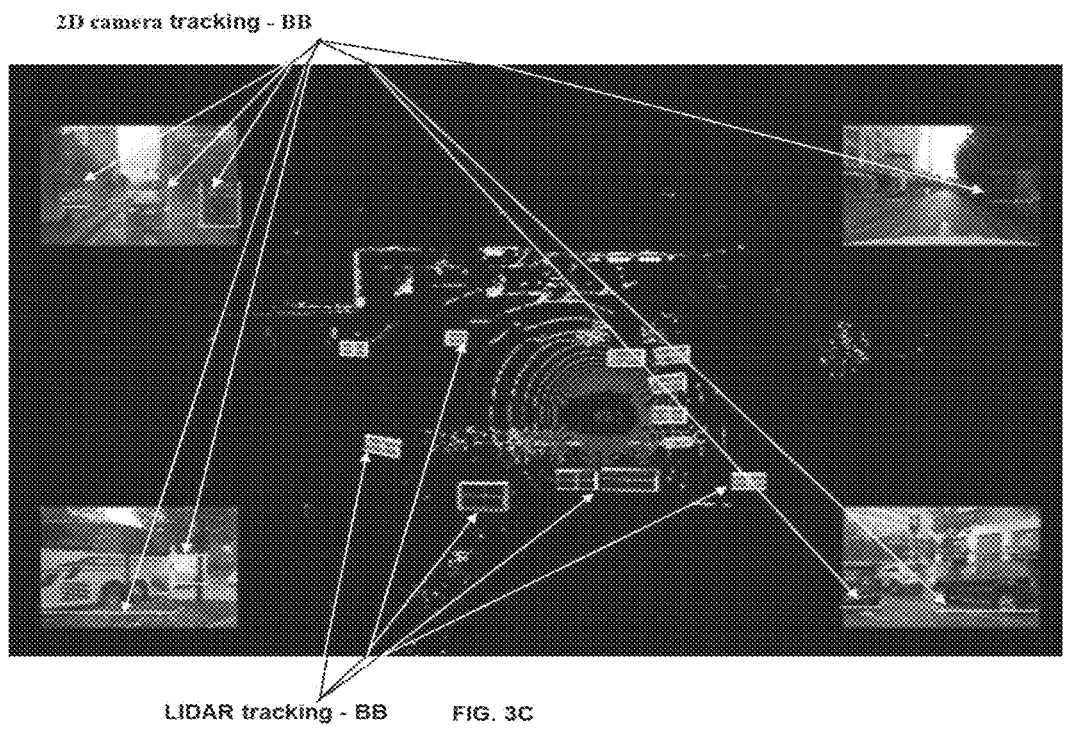

Referring to the steps of the method 200, which can be understood in conjunction with FIG. 3A-3C depicting an overview of architecture of the system of FIG. 1 at step 202 of the method 200, the one or more hardware processors 104 receive a streaming data comprising (a) the plurality of 2D images of an environment surrounding a vehicle via the 2D camera set up mounted on the vehicle, and (b) the plurality of 3D point clouds of the environment via the LIDAR mounted on the vehicle. The streaming data comprising the 2D images from 3 cameras of the 2D camera set up capturing left, front, and right view of the environment from the vehicle of along with the 3D point cloud input for a given time instant are depicted in FIG. 3B. It should be understood that the images are representative and are added for better understanding of input and output the system 100. The low resolution and lower scale and grey scale of the image is to be understood in context of representative images. The tracked objects with Bounding Boxes (BBs) from the input images are depicted in FIG. 3C, as displayed to an end viewer. The detection and tracking is explained with help of steps 204 through 210.

Referring to the step 204 of the method 200, the one or more hardware processors 104 convert each of the plurality of 3D point clouds to corresponding plurality of 2D Bird's Eye View (BEV) images.

At step 206 of the method 200, the one or more hardware processors 104 simultaneously process the received data. Thus, the system 100 performs following actions (a), (b) and (c) at step 206:

(a) The plurality of 2D images are processed using the first 2D object detector based on the customized Neural Network (NN) architecture employing the MISH activation function to detect a first set of objects in each of the plurality of 2D images. The first 2D object detector is explained in conjunction with FIGS. 4A through 5B. Further, the first set of objects in each of the 2D images is labelled with a tracker ID to track 2D camera objects corresponding to the first set of objects using the 2D camera tracker, explained in conjunction with FIG. 8 and FIG. 9. The 2D camera tracker contains algorithms, that helps in matching bounding box in $N^{th}$ frame to that in $(N+1)^{th}$ frame and then predicting a box when object detection fails. It's built on top on top of correlation tracker and added with geometrical and feature matching techniques to get robust performance.

(b) Similarly, the plurality of 2D BEV images are processed to detect a second set of objects in each of the plurality of 2D-BEV images using the second 2D object detector based on the customized NN architecture employing the MISH activation function, The second 2D object detector has similar architecture as the first 2D object detector and is explained in conjunction with FIGS. 4A through 5B. The detected second set of objects are then labelled with the tracker ID to track 2D-BEV objects corresponding to the second set of objects using the 2D-BEV tracker. The 2D-BEV tracker can be understood in conjunction with FIG. 8 and FIG. 9 that explain the 2D camera tracker, since the architecture of the 2D-BEV tracker is similar to the 2D camera tracker.

Figure 7:
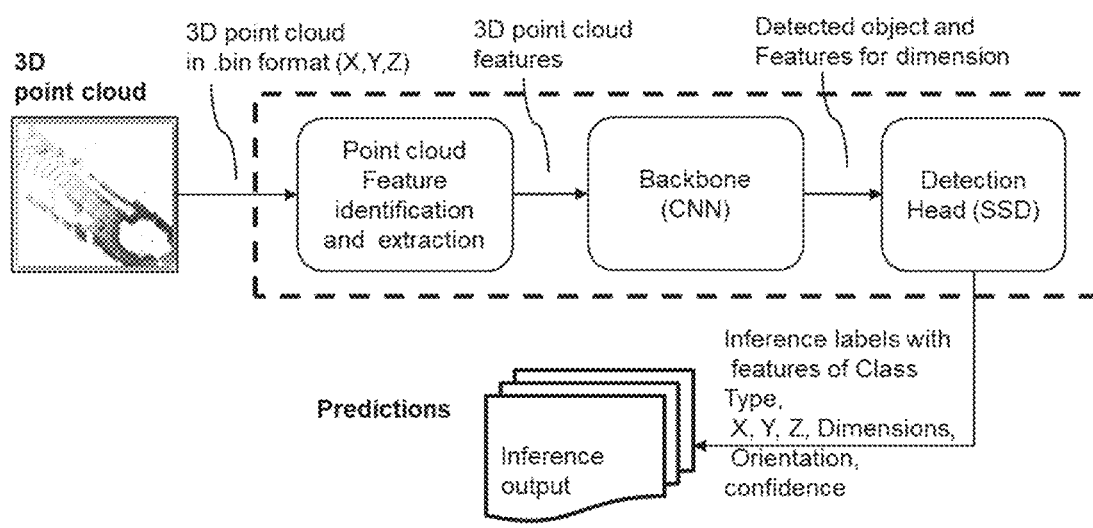
FIG. 7 depicts detection of set of objects in 3D point clouds using a 3D LIDAR object detector, in accordance with some embodiments of the present disclosure.

(c) Similarly, the plurality of 3D point clouds are processed to (i) to detect a third set of objects in each of the plurality of 3D point clouds using a 3D LIDAR object detector as explained in conjunction with FIG. 7. The 3D LIDAR object detector uses Artificial Intelligence (AI) based detection algorithms, known in the art. The 3D LIDAR object detector takes point cloud input in form of X, Y, Z, and intensity and utilizes a point pillar approach for predictions, wherein the output of the 3D LIDAR object detector contains X, Y, Z, dimensions, ClassType, Orientation (Yaw) and confidence of the object. Each of the detected third set of objects corresponding to each of the plurality of 3D point clouds are labelled with the tracker ID to track 3D LIDAR objects corresponding to the third set of objects using the 3D LIDAR tracker. The workflow of the 3D LIDAR tracker is provided below and follows techniques used in the art:
1. Assign tracker id of object on first occurrence.
2. Apply Center point based algorithm velocity algorithm and Unscented Kalman filter to map the object of current frame and next frame (Euclidian distance on each axis).
3. Fill missing detection using Kalman filter and velocity tracker predictions.
4. Verify 3D IOU over lapping, confidence and number of occurrence to remove duplicate detections.
5. Update velocity, number of occurrence, change in orientation, confidence on each frame.
6. Update predictions using Kalman filter UKF.
7. Generate 3D Lidar tracker output.

At step 208 of the method 200, the one or more hardware processors generate the fused LIDAR tracker for a plurality of fused LIDAR objects (fused LIDAR objects) by determining correspondence between the 2D-BEV objects in the 2D-BEV tracker and 3D LIDAR objects in the 3D LIDAR tracker. The steps executed by the system 100 for generating the fused LIDAR tracker are provided below:

1. Determine 2D IOU overlap to find correspondence 3D LIDAR and 2D BEV detections.
2. Update Tracker ID in case of ID mismatch in 3D lidar for mapped objects.
3. Update missing 3D detection for objects mapped with ID will be filled with previous frame size.
4. Set tracker confidence for object present in both 2D-BEV tracker and 3D LIDAR tracker.
5. Generate the fused LIDAR tracker output.

Once the fused LIDAR tracker is generated, then at step 210 the of the method 200, the one or more hardware processors 104 generate the integrated tracker by determining correspondence between the fused LIDAR objects in the fused LIDAR tracker and the 2D camera objects in the camera tracker. The integrated tracker is explained in conjunction with FIG. 10 and steps mentioned below:

Generating the integrated tracker comprises following steps (a) to (h).

(a) Reading output from the fused LIDAR tracker and the 2D camera tracker.

(b) Creating a look up table for Ego motion corrected each of the plurality of 3D point clouds and corresponding plurality of 2D images using a calibration matrix.

Figure 10:
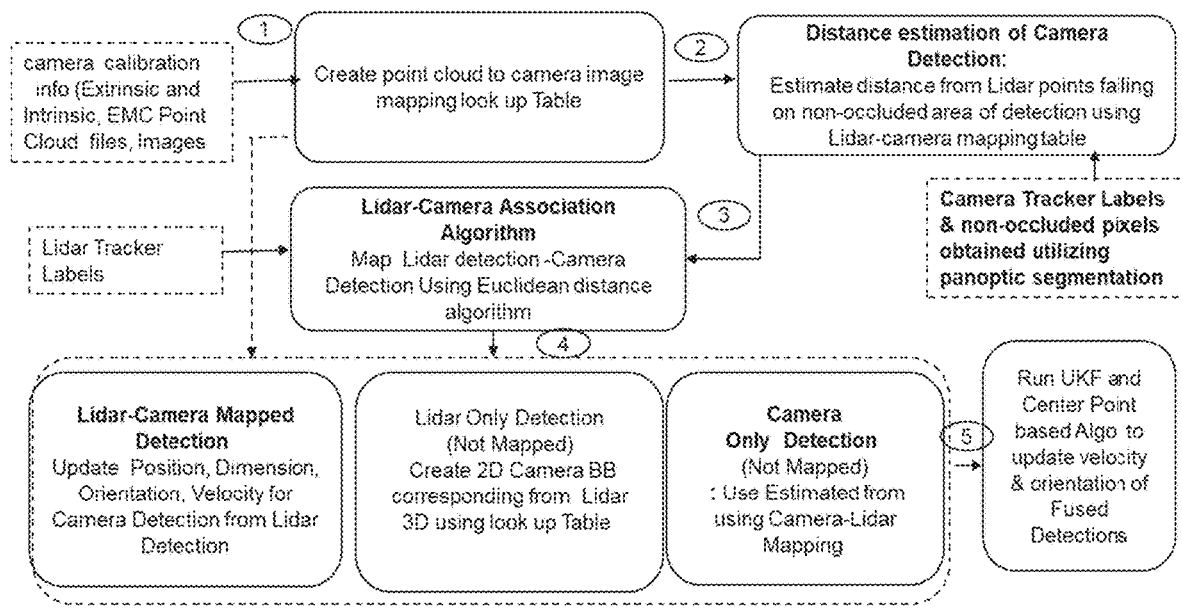
FIG. 10 depicts tracker fusion architecture to generate an integrated tracker by fusing trackers IDs detected by the 2D camera tracker and the 3D LIDAR object detector, in accordance with some embodiments of the present disclosure.

(c) Identifying a non-occluded area in 2D bounding box by superimposing 2D bounding box on a panoptic segmentation output using the panoptic module as depicted in FIG. 3A and FIG. 10. The panoptic segmentation approach enables obtaining a semantic segmentation and an instance segmentation for the 2D objects in frame of a camera of the 2D camera set up, wherein only visible pixels corresponding to the 2D objects are extracted from a camera frame by superimposing the 2D BB against panoptic segmentation output and during fusion enables eliminating 3D LIDAR points falling from irrelevant objects to provide accurate real world position of the detected objects in the 3D point cloud. The panoptic segmentations is described in conjunction with FIGS. 11A and 11B (d) Calculating positions of camera 2D detections from reprojected LIDAR points on the non-occluded area of a 2D Bounding Box (BB) by referring a point cloud-image look up table. A best cluster is identified for distance estimation by selecting a set of LIDAR points of the non-occluded area using a density-based spatial clustering with noise, wherein a dominant cluster selection approach is applied to select the best cluster. Accuracy of selection of cluster is further ensured by assigning distance reliability based on number of points and trajectory of the object. Any deviation in position are corrected by center point based velocity and unscented Kalman filter merged with above algorithms. Longitudinal and lateral position is decided by taking the mean of best cluster from nonoccluded area. In an embodiment, the best cluster is selected based on a plurality of algorithms and criteria comprising DB scan, most dominant clustering selection, differentiating distance reliability based on number of points and trajectory of objects. Flattening of spikes in the positions is performed using a center point based velocity and an unscented Kalman filter merged with a plurality of algorithms used for best cluster selection. Deviations in the camera 2D detections corresponding to objects detected in only the camera tracker are corrected by applying center point based velocity and unscented Kalman filter merged with above approach.

(e) Mapping the 2D camera objects with estimated distance to the plurality of fused LIDAR objects by selecting closest Euclidean match of a non-mapped detection.

(f) Merging attributes associated with the plurality of fused LIDAR object with attributes associated with a corresponding 2D camera object.

(g) Determining if one or more 2D camera objects fail to have corresponding mapping with the fused LIDAR objects, wherein position of the 2D BB determined by reprojection process is use.

(h) Determining if one or more fused LIDAR objects fail to have corresponding mapping with the 2D camera objects, and deriving the attributes associated with the plurality of 2D camera objects for the one or more fused LIDAR objects from one of previous occurrence of the object and default values.

A stability measure is introduced for ensuring track ID maintenance by keeping a history of mapping between LIDAR—Camera IDs. This helps to overcome track ID switching either in LIDAR or camera by referring the history look up.

Figure 4A:
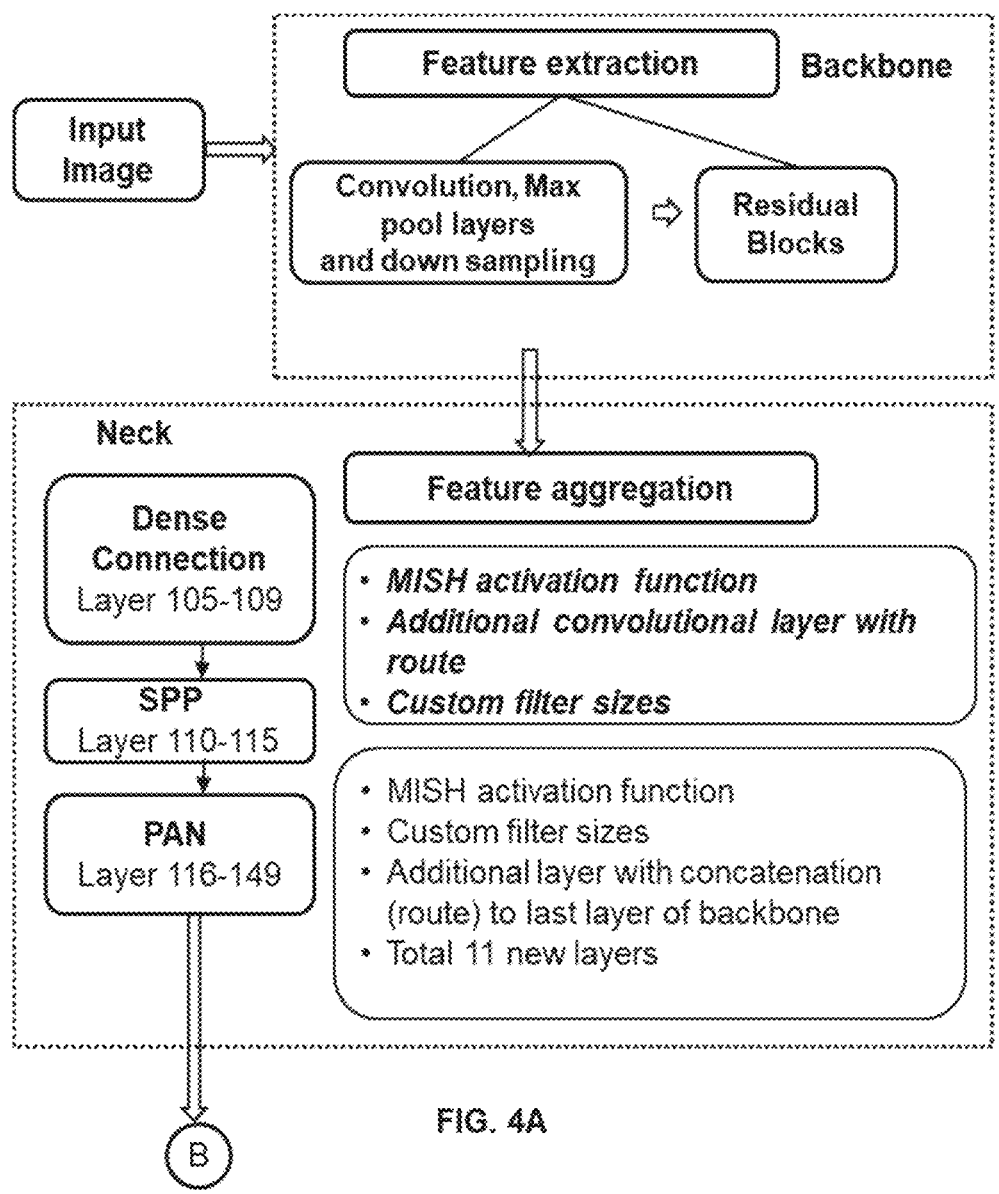
FIGS. 4A and 4B (collectively referred as FIG. 4) depict architecture of 2D object detector of the system of FIG. 1 that is based on a customized Neural Network (NN) architecture employing a MISH activation function, in accordance with some embodiments of the present disclosure.
Figure 4B:
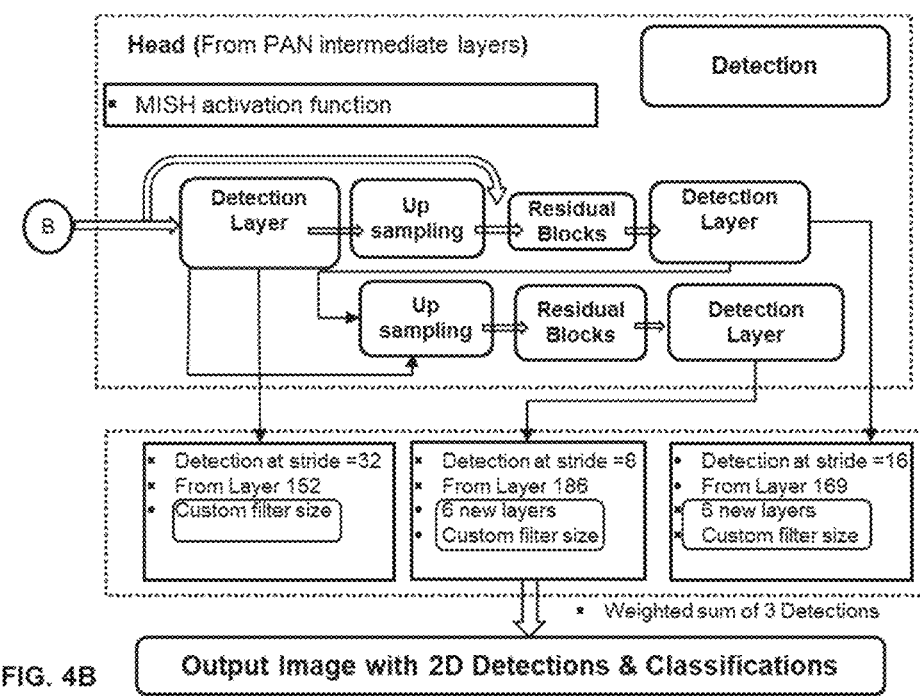

FIGS. 4A and 4B (collectively referred as FIG. 4) depict architecture of 2D object detector of the system of FIG. 1 that is based on the customized Neural Network (NN) architecture employing the MISH activation function, in accordance with some embodiments of the present disclosure. FIG. 4A depicts a backbone and a neck of the customized Neural Network (NN) architecture and FIG. 4B depicts a head. As can be seen in FIG. 4A, the backbone is based on the conventional architecture. However, in the neck Leaky RELU activations are replaced with the MISH activation functions for improved accuracy. The neck consists of:

1. Dense connection comprising an additional convolutional layer for improved feature extraction.
2. A standard SPP (Spatial Pyramid Pooling),
3. PAN (Path Aggregation Network) comprising 5 convolutional layers for improved feature extraction and an additional Spatial Attention Module (SAM). SAM helps to extract the relevant features by focusing only on the required objects that contribute to the detection/classification tasks.

The head comprises the MISH activation function replacing the conventional Leaky RELU activations for improved accuracy. Further, a scaling factor is replaced at all the three detection layers for improved grid sensitivity. Further for detection layers responsible for small and medium sized objects—3 convolutional layers are added for improved feature extraction and an additional Spatial Attention Module (SAM). This has resulted in improving detections for small and medium-sized objects.

Table 1 below depicts a comparative analysis between conventional 2D object detection NN architecture and the 2D object detector of the system of FIG. 1 that is based on the customized NN architecture employing the MISH activation function.

TABLE 1

| Features | Limitations In Existing Architecture | Modified Architecture | Enhancements |
|---|---|---|---|
| Total number of Layers | 162 | 187 | Better feature extraction using additional layers for improved mean Average Precision (mAP) of detection. |
| Activation function | Leaky ReLU: Poor handling in training if a neuron always outputs negative values causing vanishing gradient problem | Custom NN architecture employing the MISH activation function | Preserves negative values, better regularization, and generalization in training. This has resulted in improving detections in noisy scenarios. |
| SAM Layer in PAN | Not present | Present | Refined feature extraction for the objects in cluttered scenarios. |
| No. of Convolutional layers | 110 | 122 | Higher convolutional layers results in better feature extraction which in turn contributes to improved mAP (mean Average Precision) of detection. |
| SAM layer in detection head | Not present | 2 SAM layers | Improved detections for small and medium-sized objects due to refined feature extraction. |

Figure 5A:
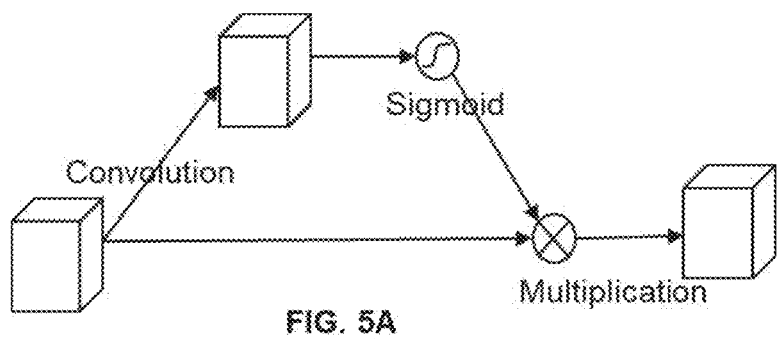
FIG. 5A depicts SAM layer of 2D object detector, in accordance with some embodiments of the present disclosure.

FIG. 5A depicts SAM layer of 2D object detector, in accordance with some embodiments of the present disclosure. Attention modules are recently used in Convolutional Neural Nets (CNNs) to make network focus not on the whole but specifically on the objects present in an image. These modules help to solve the where and what questions by telling a network to give more weight on the contextual information around an object and which features are important respectively. The sigmoid activation function used here helps to magnify all the object's contextual information. Values that are not playing any role in the detection/classification task will be down-weighted. The spatial attention mask is applied to the input feature to output the refined feature maps. Using SAM layer in the detection head results in in improving the detections for small and medium-sized objects.

Figure 5B:
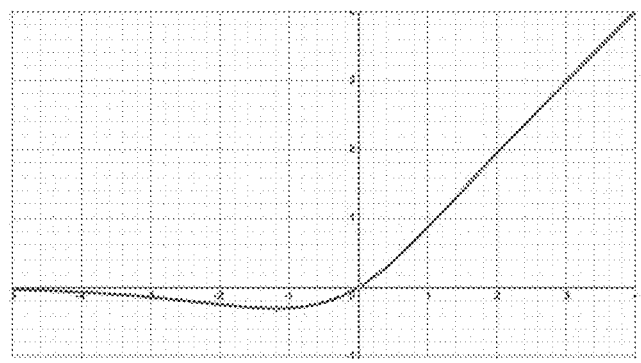
FIG. 5B depicts the MISH activation function used by customized Neural Network architecture.

FIG. 5B depicts known MISH activation function customized NN architecture, which is defined mathematically as:

$$f(x) = x \cdot \tanh(\text{softplus}(x)) = x \cdot \tanh(\ln(1+e^x)) \quad (1)$$

Using the MISH activation in Neck and detector Head has resulted in accuracy gains. The MISH activation function can handle the neuron updates for negative values with the help of below properties:

1. Non-monotonic function: Preserves negative values, that stabilize the network gradient flow and unlike ReLU, and almost solving Dying ReLU problem and helps to learn more expressive features.
2. Unboundedness and Bounded Below: Former helps to remove the saturation problem of the output neurons and the latter helps in better regularization of networks.
3. Infinite Order of Continuity: Unbiased towards initialization of weights and learning rate due to the smoothness of a function helping for the better generalizations.
4. Scalar Gating: Scalar Gating is an important property of this function and so it becomes logical and can easily replace the pointwise functions like ReLU,
5. High compute function but increases accuracy: Although being high-cost function, it has proven itself better in deep layers in comparison to ReLU.

Figure 6:
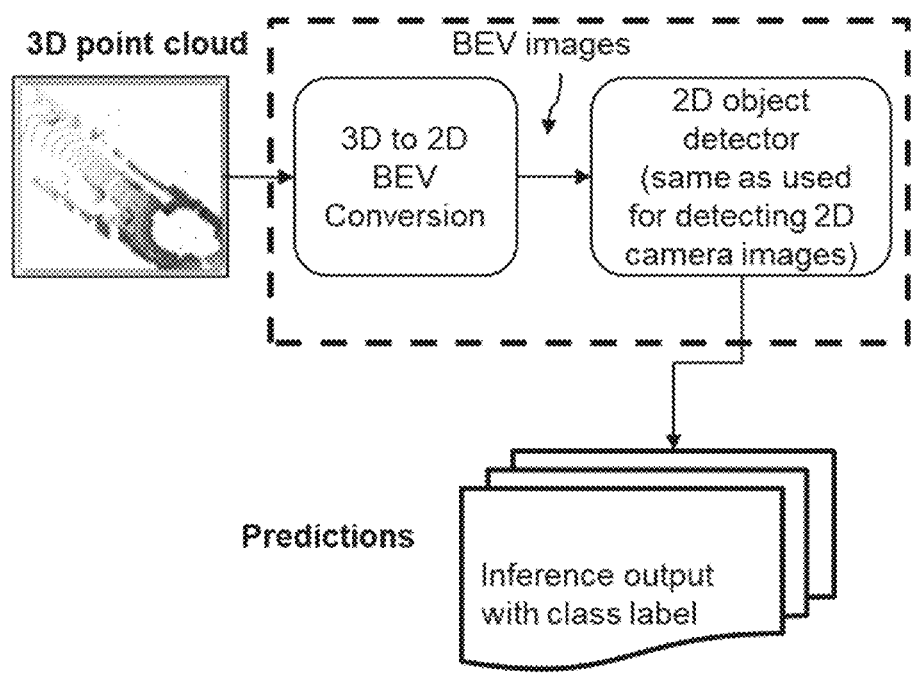
FIG. 6 depicts 3D point cloud to 2D-BEV image conversion and detection of set of objects in 2D-BEV images using the 2D object detector, in accordance with some embodiments of the present disclosure.

FIG. 6 depicts 3D point cloud to 2D-BEV image conversion using distance to image pixel mapping and detection of set of objects in 2D-BEV images using the 2D object detector, in accordance with some embodiments of the present disclosure.

FIG. 7 depicts detection of set of objects in 3D point clouds using the 3D LIDAR object detector, in accordance with some embodiments of the present disclosure. The AI based 3D LIDAR detector comprises the neck, A CNN based backbone and head. The 3D LIDAR detector accepts 3D point cloud as input and learns to predict a 3D oriented box for objects. It basically has a feature encoder that converts the point cloud to a Pseudo Image. The 3D point cloud is discretized into an evenly spaced grid, creating a set of pillars (Point-Pillars). A linear layer is applied followed by BatchNorm and RELU. This is followed by a max pooling operation over the channels. Once encoded, the features are scattered back to the original pillar locations to create a pseudo-image. A Single Shot Detector is used for the final detection from the feature extractor and height and elevation of the objects are found using regression.

Figure 8:
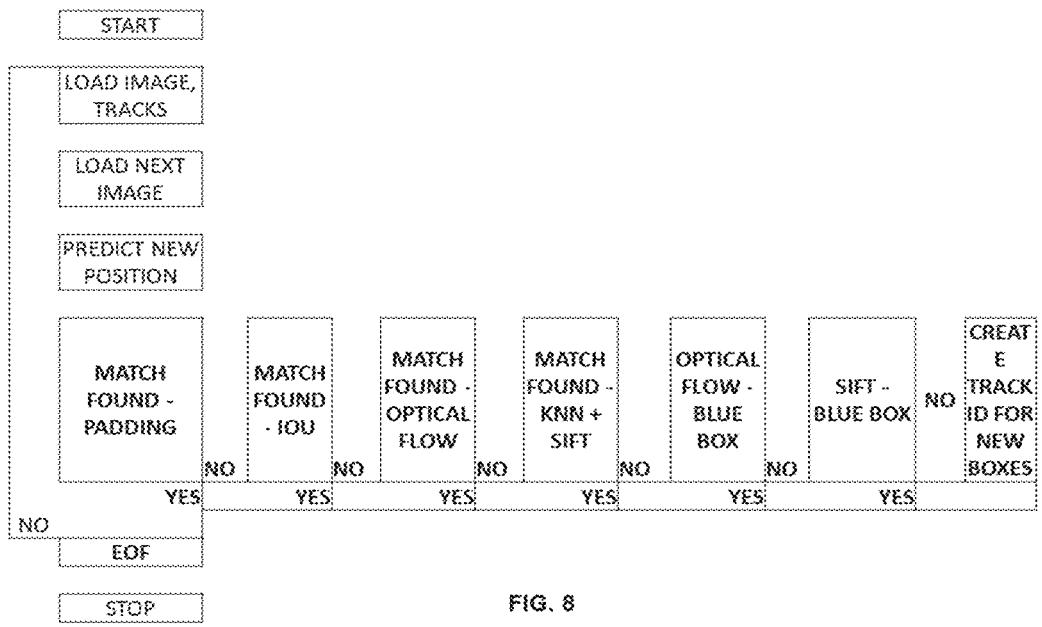
FIG. 8 depicts architecture of 2D camera tracker of the system of FIG. 1, in accordance with some embodiments of the present disclosure.

FIG. 8 depicts architecture of 2D camera tracker of the system of FIG. 1, in accordance with some embodiments of the present disclosure. the 2D camera tracker comprises:

1. A K Nearest Neighbour (KNN) stage to address drifting of BB box due to Handling abrupt size variation due to diverging/converging motion of objects;
2. A plurality of geometric and feature matching stages comprising a padding, an optical flow, a Scale-Invariant Feature Transform (SIFT) for handling track ID association between object detection and the 2D camera tracker in complicated scenarios; and
3. The SIFT and the optical flow based feature matching approach to control ghost tracking.

Table 2 below provides architecture details and the technical advantages obtained by the 2D camera tracker.

TABLE 2

| | | WHAT |
|---|---|---|
| Stage 1 | Padding | COD box is padded with threshold. If CT box falls in padded COD box, then ID is mapped. If not sent to next stage. |
| Stage 2 | IOU | If IOU of COD box and CT box crosses threshold, ID is mapped. If not sent to next stage. |
| Stage 3 | Optical Flow | If total number of optical flow features of CT box falling in COD box crosses threshold, ID is mapped. If not sent to next stage. |
| Stage 4 | KNN + SIFT | Nearest COD boxes are fetched for CT box and their SIFT features are compared. If features matches as per required threshold, ID is mapped otherwise it is treated as OD missing for that CT and sent to next stage. |
| Stage 5 | Optical Flow | If total number of optical flow features of POD box falling in CT box crosses threshold, CT box is shown with same ID. If not sent to next stage. |
| Stage 6 | SIFT | POD box SIFT features are compared with CT box SIFT features. If features matches as per required threshold, CT box is shown with same ID. If not, discarded |
| Stage 7 | New Track | All remaining detections which are not mapped during the above stages get assigned new track IDs |
| | | WHY |
| Stage 1 | Padding | Considering vehicle moved very less distance across frames, it falls in Padding threshold |
| Stage 2 | IOU | Considering vehicle moved less distance (more than padding threshold) across frames, it falls in IOU threshold |
| Stage 3 | Optical Flow | Considering vehicle moved some distance (more than IOU threshold) across frames, it's features can be mapped using OF as size, shape and orientation not changed much. |
| Stage 4 | KNN + SIFT | Considering vehicle moved more distance (looks like that in image but not really - nonlinear motion) across frames, it's features can be found out and mapped using SIFT. If not mapped here, this is considered as OD miss |
| Stage 5 | Optical Flow | Even OD missed, tracker predicts a box which might be correct. That could be checked using Optical Flow (OF) considering that vehicle moved only some distance. |
| Stage 6 | SIFT | Considering vehicle moved more distance, features are compared with SIFT |
| Stage 7 | New Track | All remaining detections which are not mapped during the above stages get assigned new track IDs |

POD Previous frame Object Detection (OD)
COD Current frame OD
CT Correlation Tracker of POD
ID mapping is done for a given COD box with CT box The table 3 below highlights features of the 2D camera tracker

TABLE 3

| Features | |
|---|---|
| Handling Occlusion | Tracking of objects in 2D BEV images helps in addressing the occlusion issues present in object tracking with camera alone. |
| Handling abrupt size variation due to diverging/converging motion of objects in incoming outgoing traffic (typically in non-ego lanes) | Introduced KNN stage to address drifting of tracker box |
| Handling track ID association between Object detection & | Introduced multiple geomatic & feature matching stages (Padding, Optical Flow, SIFT) for association-checking on top of |
| Tracker in complicated scenarios (poor visibility etc.) | correlation filter and hence robust against in ID switching in complicated scenarios |
| Control of ghost-tracking when object detection is missing | Introduced SIFT & Optical flow-based feature matching approach to control ghost-tracking |
| Seamless object tracking across multiple camera views | Capable of unification of track IDs across multiple camera views |

Figure 9:
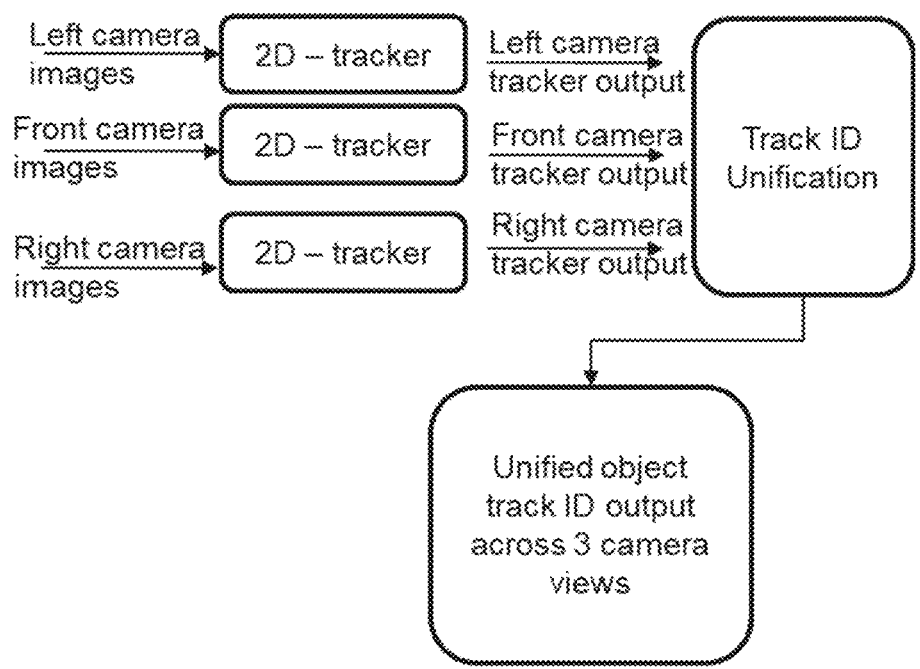
FIG. 9 depicts unification of tracker IDs detected by 2D camera trackers associated with each of the multiple cameras of a 2D camera set up mounted on the autonomous vehicle, in accordance with some embodiments of the present disclosure.

FIG. 9 depicts unification of tracker IDs detected by 2D camera trackers associated with each of the multiple cameras of a 2D camera set up mounted on the autonomous vehicle, in accordance with some embodiments of the present disclosure. Unification of track IDs across multiple camera views is performed using custom rule based techniques employing the bounding box to bounding box classification and geometry matching in a predefined region of interest (ROI) in a pair of camera views under consideration.

Figure 11A:
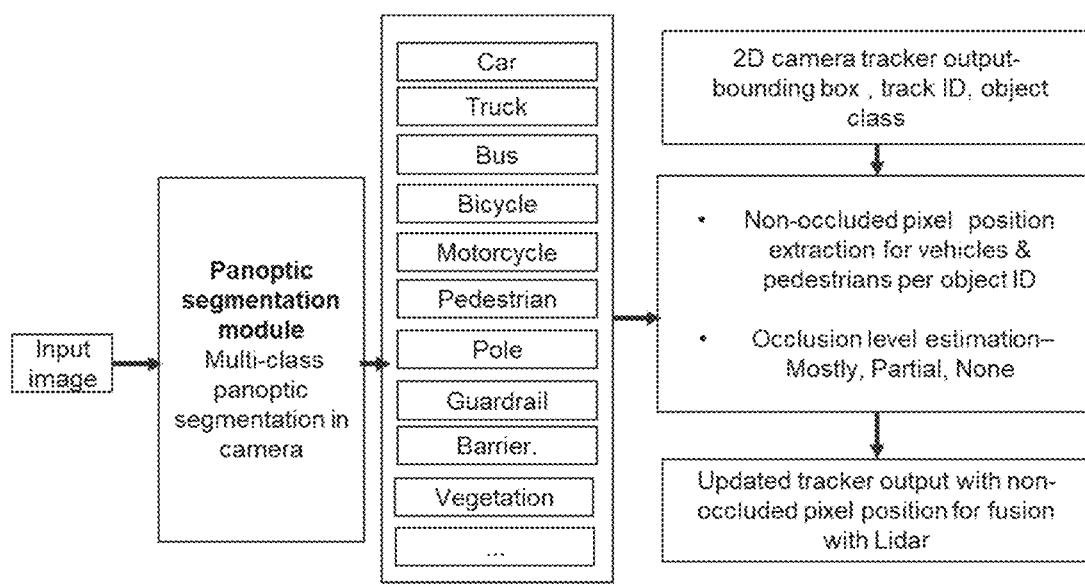
FIG. 11A depicts an architecture used by the system of FIG. 1 for non-occluded points extraction based on a panoptic segmentation, in accordance with some embodiments of the present disclosure.
Figure 11B:
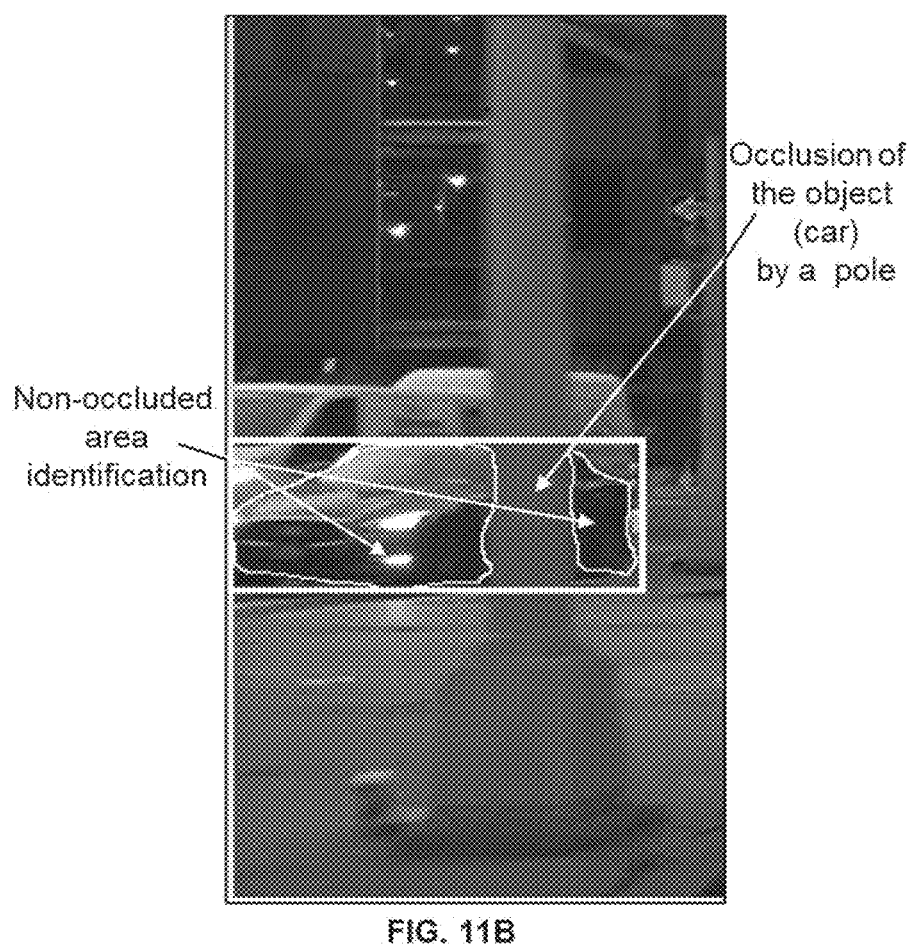
FIG. 11B depicts extraction of non-occluded area of the detected objects using panoptic segmentation, in accordance with some embodiments of the present disclosure.

FIG. 11A depicts an architecture used by the system of FIG. 1 for a non-occluded points extraction based on the panoptic segmentation, in accordance with some embodiments of the present disclosure. Using the panoptic segmentation module, both the semantic and the instance segmentation are obtained for the objects in the camera frame. Instance segmentation outputs helps to derive the contours of each objects like car, truck, pedestrian etc. whereas pixels representing pole, guardrails, road etc. is derived from the semantic segmentation. By superimposing the 2D bounding box against panoptic segmentation output, only visible pixels corresponding to the object is extracted. For example, 'car' could be occluded by 'pole' or 'guard rail pixels' and intended is to obtain the pixel position representing 'car' only from the Car's tracked box. As depicted in FIG. 11B, the car is occluded by a pole. By superimposing the 2D bounding box against the panoptic segmentation output, non-occluded points for the car, get extracted and during fusion, this eliminates the LIDAR points falling from poles and provides accurate real world position of the detected objects in the point cloud.

The table 4 below mentions the features of the non-occluded points extraction based on panoptic segmentation.

TABLE 4

| Features | Technical advance/advantage |
|---|---|
| Estimation of occlusion levels-Mostly, Partly, None | Superimposing the camera 2D bounding box with panoptic segmentation (which in addition to vehicle/pedestrian classes, provides classes like poles, guardrails, barrier, vegetation etc.) different occlusion levels for vehicles and pedestrians are determined. |
| Non-occluded points extraction per track ID | Superimposing the camera 2D bounding box with panoptic segmentation, only the non-occluded pixels of vehicle/pedestrian are extracted and when those points get projected in Lidar space for fusion, helps to remove unwanted point-cloud-reflections from surrounding objects (like pole, guardrails etc.) |
| Removal of false detection in 2D object detection | By cross-checking the detections in 2D object detections against panoptic output helps to remove false bounding boxes (e.g., a bounding box falsely detected as Car on a tree, gets eliminated when cross-checked against the panoptic output) |

Results: The system 100 was evaluated using multiple openly available Autonomous vehicle datasets and the FIG. 3C provides an example snapshot of the output. KPI's of the evaluation on a validation dataset is furnished in the below table 5 and shows robust tracking with high accuracy.

TABLE 5

| Parameter | Accuracy % |
|---|---|
| Precision (TP/TP + FP) | 93% |
| Recall (TP/TP + FN) | 92% |
| Retention of Track ID | 96% |

TP: True Positive
FP: False Positive
FN: False Negative

Thus, the method and system disclosed herein provides an approach for object detection and tracking using a fusion of 3D LIDAR, 3D-2D BEV image and 2D image based detection and tracking which enables combining the motion-based tracker on LIDAR space and feature based tracking image space. This helps for retention of the object tracks even the object is not visible in one of the sensors or even if there is a noise in the input. Further, utilizes the enhanced NN architecture based on the MISH activation function for improved object detection in camera for small and medium sized objects. The same architecture is utilized for 3D-2D BEV image-based object detection. Further, robust multi-stage feature-based tracker for 2D camera and 2D BEV, which addresses the different traffic directions, varying sizes of objects and the transition of objects from one camera to the other. Furthermore, unscented Kali an based approach is applied on 2D BEV tracker considering rate of change of pixel. This helps to continue tracking when features of object missing in images. Furthermore, the IOU overlap number of occurrence and confidence used to remove overlapping and false detections. Tracker assign tracker confidence for objects based on whether it is detected in how many trackers. This helps to evaluate false detection along with detection confidence. The panoptic segmentation algorithms used herein by the system improve selection of area of 2D camera box for distance calculation. This approach enhance accuracy in case of occlusion.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein, Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for object tracking, the method comprising:
   receiving, by one or more hardware processors, a streaming data comprising (a) a plurality of 2-Dimensional (2D) images of an environment surrounding a vehicle via a 2D camera set up mounted on the vehicle, and (b) a plurality of 3-Dimensional (3D) point clouds of the environment via a Light Detection and Ranging (LIDAR) mounted on the vehicle;

converting, by the one or more hardware processors, each of the plurality of 3D point clouds to corresponding plurality of 2D Bird's Eye View (BEV) images;

simultaneously processing, by the one or more hardware processors:
- (a) the plurality of 2D images (i) to detect a first set of objects in each of the plurality of 2D images using a first 2D object detector based on a customized Neural Network (NN) architecture employing a MISH activation function, and (ii) to label each object of the first set of objects of each of the plurality of 2D images with a tracker ID to track 2D camera objects corresponding to the first set of objects using a 2D camera tracker,
- (b) the plurality of 2D BEV images to (i) detect a second set of objects in each of the plurality of 2D-BEV images using a second 2D object detector based on the customized NN architecture employing the MISH activation function, and (ii) label each object of the second set of objects of each of the plurality of 2D-BEV images with the tracker ID to track 2D-BEV objects corresponding to the second set of objects using a 2D-BEV tracker, and
- (c) the plurality of 3D point clouds to (i) detect a third set of objects in each of the plurality of 3D point clouds using a 3D LIDAR object detector, and (ii) label each object of the third set of objects of each of the plurality of 3D point clouds with the tracker ID to track 3D LIDAR objects corresponding to the third set of objects using a 3D LIDAR tracker;

generating, by the one or more hardware processors, a fused LIDAR tracker for a plurality of fused LIDAR objects by determining correspondence between the 2D-BEV objects in the 2D-BEV tracker and the 3D LIDAR objects in the 3D LIDAR tracker; and generating, by the one or more hardware processors, an integrated tracker by determining correspondence between the plurality of fused LIDAR objects in the fused LIDAR tracker and the 2D camera objects in the camera tracker, generating the integrated tracker comprising:
- (a) reading output from the fused LIDAR tracker and the 2D camera tracker;
- (b) creating a look up table for corrected Ego motion corrected of each of the plurality of 3D point clouds and corresponding plurality of 2D images using a calibration matrix;
- (c) identifying a non-occluded area in 2D bounding box by superimposing the 2D bounding box on a panoptic segmentation output using a panoptic segmentation approach, wherein the panoptic segmentation approach enables obtaining a semantic segmentation and an instance segmentation for the 2D objects in a camera frame of a camera of the 2D camera set up, wherein only visible pixels corresponding to the 2D objects are extracted from the camera frame by superimposing the 2D bounding box against the panoptic segmentation output and during fusion enables eliminating 3D LIDAR points falling from irrelevant objects to provide accurate real world position of the detected objects in the 3D point clouds;
- (d) calculating positions of camera 2D detections from reprojected 3D LIDAR points on the non-occluded area of the 2D Bounding Box (BB) by referring a point cloud-image look up table wherein a best cluster is identified for distance estimation by and selecting a set of LIDAR points of the non-occluded area using a density-based spatial clustering with noise to identify a best cluster for distance estimation, wherein a dominant cluster selection approach is applied to select the best cluster;
- (e) mapping the 2D camera objects with estimated distance to the plurality of fused LIDAR objects by selecting closest Euclidean match of a non-mapped detection;
- (f) merging attributes associated with the plurality of fused LIDAR object with attributes associated with a corresponding 2D camera object;
- (g) determining if one or more 2D camera objects fail to have corresponding mapping with the fused LIDAR objects, wherein position of the 2D BB determined by reprojection process is used; and
- (h) determining if one or more fused LIDAR objects fail to have corresponding mapping with the 2D camera objects, and deriving the attributes associated with the plurality of 2D camera objects for the one or more fused LIDAR objects from one of previous occurrence of the object and default values.

2. The method of claim 1, wherein the first 2D object detector and second 2D object detector based on the customized NN architecture employing the MISH activation function comprises:
- a backbone for feature extraction from 2D images;
- a neck for feature aggregation using (i) the MISH activation function that preserves negative values, provides better regularization and generalization in training enabling enhanced detection in noisy scenarios for the received streaming data, and (ii) a Path Aggregation Network (PAN) comprising five convolutional layers further added with a Spatial Attention Module (SAM) that extract relevant features by focusing only on objects of interest that contribute to the detection tasks when in cluttered scenario; and
- a head using the MISH activation function and additional set of convolution layers for detection of small and medium sized objects.

3. The method of claim 1, wherein the 2D camera tracker comprises:
- a K-Nearest Neighbour KNN stage to address drifting of the BB due to handling abrupt size variation due to diverging or converging motion of objects;
- a plurality of geometric and feature matching stages comprising a padding, an optical flow, a Scale-Invariant Feature Transform (SIFT) for handling track ID association between object detection, and the 2D camera tracker in complicated scenarios; and
- the SIFT and the optical flow based feature matching approach to control ghost tracking.

4. The method of claim 1, wherein accuracy of selection of the best cluster is further ensured by assigning distance reliability based on number of points and trajectory of the object, extracted from superimposing 2D bounding box and the panoptic segmentation output.

5. The method of claim 1, wherein deviations in the camera 2D detections corresponding to objects detected in only the camera tracker are corrected by applying center point based velocity and unscented Kalman filter, and wherein longitudinal and lateral position is decided by taking the mean of 'best cluster from nonoccluded area.

6. The method of claim 1, wherein the 2D camera set up comprises a plurality of cameras with a Field of View (FoV) of each of the plurality of 2D cameras covering distinct regions of the environment, and seamless tracking across multiple camera views is obtained by unification of camera tracker for each of the plurality of cameras.

7. A system for object tracking, the system comprising:
a memory storing instructions;
one or more Input/Output (I/O) interfaces; and
one or more hardware processors coupled to the memory via the one or more I/O interfaces, wherein the one or more hardware processors are configured by the instructions to:
receive a streaming data comprising (a) a plurality of 2-Dimensional (2D) images of an environment surrounding a vehicle via a 2D camera set up mounted on the vehicle, and (b) a plurality of 3-Dimensional (3D) point clouds of the environment via a Light Detection and Ranging (LIDAR) mounted on the vehicle;
convert each of the plurality of 3D point clouds to corresponding plurality of 2D Bird's Eye View (BEV) images;
simultaneously process:
  (a) the plurality of 2D images (i) to detect a first set of objects in each of the plurality of 2D images using a first 2D object detector based on a customized Neural Network (NN) architecture employing a MISH activation function, and (ii) to label each object of the first set of objects of each of the plurality of 2D images with a tracker ID to track 2D camera objects corresponding to the first set of objects using a 2D camera tracker,
  (b) the plurality of 2D BEV images to (i) detect a second set of objects in each of the plurality of 2D-BEV images using a second 2D object detector based on the customized NN architecture employing the MISH activation function, and (ii) label each object of the second set of objects of each of the plurality of 2D-BEV images with the tracker ID to track 2D-BEV objects corresponding to the second set of objects using a 2D-BEV tracker, and
  (c) the plurality of 3D point clouds to (i) detect a third set of objects in each of the plurality of 3D point clouds using a 3D LIDAR object detector, and (ii) label each object of the third set of objects of each of the plurality of 3D point clouds with the tracker ID to track 3D LIDAR objects corresponding to the third set of objects using a 3D LIDAR tracker;
generate a fused LIDAR tracker for a plurality of fused LIDAR objects by determining correspondence between the 2D-BEV objects in the 2D-BEV tracker and the 3D LIDAR objects in the 3D LIDAR tracker; and
generate an integrated tracker by determining correspondence between the plurality of fused LIDAR objects in the fused LIDAR tracker and the 2D camera objects in the camera tracker, the integrated tracker generated by:
  (a) reading output from the fused LIDAR tracker and the 2D camera tracker;
  (b) creating a look up table for corrected Ego motion corrected of each of the plurality of 3D point clouds and corresponding plurality of 2D images using a calibration matrix;
  (c) identifying a non-occluded area in 2D bounding box by superimposing the 2D bounding box on a pan-optic segmentation output using a panoptic segmentation approach, wherein the panoptic segmentation approach enables obtaining a semantic segmentation and an instance segmentation for the 2D objects in a camera frame of a camera of the 2D camera set up, wherein only visible pixels corresponding to the 2D objects are extracted from the camera frame by superimposing the 2D bounding box against the panoptic segmentation output and during fusion enables eliminating 3D LIDAR points falling from irrelevant objects to provide accurate real world position of the detected objects in the 3D point clouds;
  (d) calculating position of camera 2D detection from reprojected 3D LIDAR points on the non-occluded area of the 2D Bounding Box (BB) by referring a point cloud-image look up table wherein a best cluster is identified for distance estimation by and selecting a set of LIDAR points of the non-occluded area using a density-based spatial clustering with noise to identify a best cluster for distance estimation, wherein a dominant cluster selection approach is applied to select the best cluster;
  (e) mapping the 2D camera objects with estimated distance to the plurality of fused LIDAR objects by selecting closest Euclidean match of a non-mapped detection;
  (f) merging attributes associated with the plurality of fused LIDAR object with attributes associated with a corresponding 2D camera object;
  (g) determining if one or more 2D camera objects fail to have corresponding mapping with the fused LIDAR objects, wherein position of the 2D BB determined by reprojection process is used; and
  (h) determining if one or more fused LIDAR objects fail to have corresponding mapping with the 2D camera objects, and deriving the attributes associated with the plurality of 2D camera objects for the one or more fused LIDAR objects from one of previous occurrence of the object and default values.

8. The system of claim 7, wherein the first 2D object detector and second 2D object detector based on the customized NN architecture employing the MISH activation function comprises:
a backbone for feature extraction from 2D images;
a neck for feature aggregation using (i) the MISH activation function that preserves negative values, provides better regularization and generalization in training enabling enhanced detection in noisy scenarios for the received streaming data, and (ii) a Path Aggregation Network (PAN) comprising five convolutional layers further added with a Spatial Attention Module (SAM) that extract relevant features by focusing only on objects of interest that contribute to the detection tasks when in cluttered scenario; and
a head using the MISH activation function and additional set of convolution layers for detection of small and medium sized objects.

9. The system of claim 7, wherein the 2D camera tracker comprises:
a K-Nearest Neighbour KNN stage to address drifting of the BB due to handling abrupt size variation due to diverging or converging motion of objects;
a plurality of geomatic and feature matching stages comprising a padding, an optical flow, a Scale-Invariant Feature Transform (SIFT) for handling track ID association between object detection, and the 2D camera tracker in complicated scenarios; and the SIFT and the optical flow based feature matching approach to control ghost tracking.

10. The system of claim 7, wherein accuracy of selection of the best cluster is further ensured by assigning distance reliability based on number of points and trajectory of the object, extracted from superimposing 2D bounding box and the panoptic segmentation output.

11. The system of claim 7, wherein deviations in the camera 2D detections corresponding to objects detected in only the camera tracker are corrected by applying center point based velocity and unscented Kalman filter, and wherein longitudinal and lateral position is decided by taking the mean of 'best cluster from nonoccluded area.

12. The system of claim 7, wherein the 2D camera set up comprises a plurality of cameras with a Field of View (FoV) of each of the plurality of 2D cameras covering distinct regions of the environment, and seamless tracking across multiple camera views is obtained by unification of camera tracker for each of the plurality of cameras.

13. One or more non-transitory machine-readable information storage mediums comprising one or more instructions which when executed by one or more hardware processors cause:

receiving a streaming data comprising (a) a plurality of 2-Dimensional images of an environment surrounding a vehicle via a 2D camera set up mounted on the vehicle, and (b) a plurality of 3-Dimensional point clouds of the environment via a Light Detection and Ranging (LIDAR) mounted on the vehicle;

converting each of the plurality of 3D point clouds to corresponding plurality of 2D Bird's Eye View (BEV) images;

simultaneously processing:
(a) the plurality of 2D images (i) to detect a first set of objects in each of the plurality of 2D images using a first 2D object detector based on a customized Neural Network (NN) architecture employing a MISH activation function, and (ii) to label each object of the first set of objects of each of the plurality of 2D images with a tracker ID to track 2D camera objects corresponding to the first set of objects using a 2D camera tracker,
(b) the plurality of 2D BEV images to (i) detect a second set of objects in each of the plurality of 2D-BEV images using a second 2D object detector based on the customized NN architecture employing the MISH activation function, and (ii) label each object of the second set of objects of each of the plurality of 2D-BEV images with the tracker ID to track 2D-BEV objects corresponding to the second set of objects using a 2D-BEV tracker, and
(c) the plurality of 3D point clouds to (i) detect a third set of objects in each of the plurality of 3D point clouds using a 3D LIDAR object detector, and (ii) label each object of the third set of objects of each of the plurality of 3D point clouds with the tracker ID to track 3D LIDAR objects corresponding to the third set of objects using a 3D LIDAR tracker;

generating a fused LIDAR tracker for a plurality of fused LIDAR objects by determining correspondence between the 2D-BEV objects in the 2D-BEV tracker and the 3D LIDAR objects in the 3D LIDAR tracker; and generating an integrated tracker by determining correspondence between the plurality of fused LIDAR objects in the fused LIDAR tracker and the 2D camera objects in the camera tracker, generating the integrated tracker comprising:
(a) reading output from the fused LIDAR tracker and the 2D camera tracker;
(b) creating a look up table for corrected Ego motion corrected of each of the plurality of 3D point clouds and corresponding plurality of 2D images using a calibration matrix;
(c) identifying a non-occluded area in 2D bounding box by superimposing the 2D bounding box on a panoptic segmentation output using a panoptic segmentation approach, wherein the panoptic segmentation approach enables obtaining a semantic segmentation and an instance segmentation for the 2D objects in a camera frame of a camera of the 2D camera set up, wherein only visible pixels corresponding to the 2D objects are extracted from the camera frame by superimposing the 2D bounding box against the panoptic segmentation output and during fusion enables eliminating 3D LIDAR points falling from irrelevant objects to provide accurate real world position of the detected objects in the 3D point clouds;
(d) calculating positions of camera 2D detections from reprojected 3D LIDAR points on the non-occluded area of the 2D Bounding Box (BB) by referring a point cloud-image look up table wherein a best cluster is identified for distance estimation by and selecting a set of LIDAR points of the non-occluded area using a density-based spatial clustering with noise to identify a best cluster for distance estimation, wherein a dominant cluster selection approach is applied to select the best cluster;
(e) mapping the 2D camera objects with estimated distance to the plurality of fused LIDAR objects by selecting closest Euclidean match of a non-mapped detection;
(f) merging attributes associated with the plurality of fused LIDAR object with attributes associated with a corresponding 2D camera object;
(g) determining if one or more 2D camera objects fail to have corresponding mapping with the fused LIDAR objects, wherein position of the 2D BB determined by reprojection process is used; and
(h) determining if one or more fused LIDAR objects fail to have corresponding mapping with the 2D camera objects, and deriving the attributes associated with the plurality of 2D camera objects for the one or more fused LIDAR objects from one of previous occurrence of the object and default values.

14. The one or more non-transitory machine-readable information storage mediums of claim 13, wherein the first 2D object detector and second 2D object detector based on the customized NN architecture employing the MISH activation function comprises:

a backbone for feature extraction from 2D images;
a neck for feature aggregation using (i) the MISH activation function that preserves negative values, provides better regularization and generalization in training enabling enhanced detection in noisy scenarios for the received streaming data, and (ii) a Path Aggregation Network (PAN) comprising five convolutional layers further added with a Spatial Attention Module (SAM) that extract relevant features by focusing only on objects of interest that contribute to the detection tasks when in cluttered scenario; and a head using the MISH activation function and additional set of convolution layers for detection of small and medium sized objects.

15. The one or more non-transitory machine-readable information storage mediums of claim 13, wherein the 2D camera tracker comprises:
- a K-Nearest Neighbour KNN stage to address drifting of the BB due to handling abrupt size variation due to diverging or converging motion of objects;
- a plurality of geometric and feature matching stages comprising a padding, an optical flow, a Scale-Invariant Feature Transform (SIFT) for handling track ID association between object detection, and the 2D camera tracker in complicated scenarios; and
- the SIFT and the optical flow based feature matching approach to control ghost tracking.

16. The one or more non-transitory machine-readable information storage mediums of claim 13, wherein accuracy of selection of the best cluster is further ensured by assigning distance reliability based on number of points and trajectory of the object, extracted from superimposing 2D bounding box and the panoptic segmentation output.

17. The one or more non-transitory machine-readable information storage mediums of claim 13, wherein deviations in the camera 2D detections corresponding to objects detected in only the camera tracker are corrected by applying center point based velocity and unscented Kalman filter, and wherein longitudinal and lateral position is decided by taking the mean of best cluster from nonoccluded area.

* * * * *